US008883939B2

(12) United States Patent
Abboud et al.

(10) Patent No.: US 8,883,939 B2
(45) Date of Patent: Nov. 11, 2014

(54) METHOD FOR PRODUCING POLYMERS AND REACTOR FOR CARRYING OUT SAID METHOD

(75) Inventors: Mohammed Abboud, Mannheim (DE); Philippe Desbois, Edingen-Neckarhausen (DE); Norbert Gmähle, Maxdorf (DE); Herbert Römer, Birkenheide (DE); Thilo Krebs, Mannheim (DE); Dennis Lösch, Altrip (DE)

(73) Assignee: BASF SE, Ludwigshafen (DE)

( * ) Notice: Subject to any disclaimer, the term of this patent is extended or adjusted under 35 U.S.C. 154(b) by 331 days.

(21) Appl. No.: 13/147,238

(22) PCT Filed: Feb. 1, 2010

(86) PCT No.: PCT/EP2010/051146
§ 371 (c)(1),
(2), (4) Date: Aug. 1, 2011

(87) PCT Pub. No.: WO2010/086433
PCT Pub. Date: Aug. 5, 2010

(65) Prior Publication Data
US 2011/0294968 A1  Dec. 1, 2011

(30) Foreign Application Priority Data
Feb. 2, 2009  (EP) .................................. 09151847

(51) Int. Cl.
| | | |
|---|---|---|
| *C08F 2/00* | (2006.01) | |
| *C08G 85/00* | (2006.01) | |
| *C08F 26/06* | (2006.01) | |
| *C08F 20/00* | (2006.01) | |
| *C08F 20/58* | (2006.01) | |
| *B01J 19/24* | (2006.01) | |
| *C08G 69/16* | (2006.01) | |
| *C08G 69/04* | (2006.01) | |
| *B01J 14/00* | (2006.01) | |

(52) U.S. Cl.
CPC .... *B01J 19/2415* (2013.01); *B01J 2219/00033* (2013.01); *C08G 69/16* (2013.01); *C08G 69/04* (2013.01); *B01J 14/00* (2013.01)
USPC .......... 526/64; 526/258; 526/303.1; 526/304; 528/310

(58) Field of Classification Search
CPC ............ C08F 2/00; C08F 85/00; C08F 26/06; C08F 126/06; C08F 226/06; C08F 20/00; C08F 22/38; C08F 26/00; C08F 120/00; C08F 220/54; C08F 220/70; C08F 222/38; C08F 226/02; C08F 236/00; C08F 20/58
USPC .................. 528/310; 526/64, 258, 303.1, 304
See application file for complete search history.

(56) References Cited

U.S. PATENT DOCUMENTS

| 3,298,977 A | * | 1/1967 | Robertson et al. ............ 528/312 |
| 5,269,980 A | | 12/1993 | Levendis et al. |
| 2004/0012105 A1 | * | 1/2004 | Deppe et al. ...................... 264/4 |

FOREIGN PATENT DOCUMENTS

| DE | 3009812 A1 | 9/1981 | |
| EP | 0051210 A2 | 5/1982 | |
| EP | 0173518 A2 | 3/1986 | |
| EP | 0243177 A1 | 10/1987 | |
| WO | WO 2007067145 A1 * | 6/2007 | ................ C08F 2/18 |

* cited by examiner

Primary Examiner — David W Wu
Assistant Examiner — Elizabeth Eng
(74) Attorney, Agent, or Firm — Drinker Biddle & Reath LLP

(57) ABSTRACT

The invention relates to a process for preparing polymers from monomers and/or oligomers by adding a liquid comprising the monomers and/or oligomers dropwise to a continuous liquid phase in a reactor, the continuous liquid phase being immiscible with the liquid comprising the monomers and/or oligomers, and the monomers and/or oligomers reacting in the continuous liquid phase to give the polymer. The liquid comprising the monomers and/or oligomers is shaped to droplets outside the continuous liquid phase, which are subsequently introduced into the continuous liquid phase. The invention further relates to a reactor for performing the process, comprising a tube through which a continuous liquid phase flows, and means of generating droplets, the means of generating droplets being arranged such that the droplets are generated outside the continuous liquid phase and then introduced into the continuous liquid phase.

8 Claims, No Drawings

US 8,883,939 B2

METHOD FOR PRODUCING POLYMERS AND REACTOR FOR CARRYING OUT SAID METHOD

CROSS-REFERENCE TO RELATED APPLICATIONS

This application is a national stage application (under 35 U.S.C. §371) of PCT/EP2010/051146, filed Feb. 1, 2010, which claims benefit of European application 09151847.2, filed Feb. 2, 2009, the contents of each of which are incorporated herein by reference in their entireties.

FIELD OF THE INVENTION

The invention relates to a process for preparing polymers from monomers and/or oligomers by adding a liquid comprising the monomers and/or oligomers dropwise to a continuous liquid phase in a reactor, the continuous liquid phase being immiscible with the liquid comprising the monomers and/or oligomers, and the monomers and/or oligomers reacting in the continuous liquid phase to give the polymer. The invention further relates to a reactor for performing the process and to the use of the process and reactor.

BACKGROUND

Polymers can be prepared from monomers and/or oligomers in various ways. For example, for the preparation of polymer beads, it is possible to prepare them by a so-called droplet polymerization. In general, for droplet polymerization, liquid monomer is sprayed into a gas phase, which forms individual droplets. The monomer reacts within the droplets to give the polymer and individual polymer beads form. However, the disadvantage of this process is that the falling time of the droplets in the gas phase permits only rapid reactions. These are, for example, the polymerization of acrylic acid to superabsorbance.

In addition to the spraying of liquid monomer, it is also possible to dropletize the liquid monomers in a liquid immiscible therewith. This is known, for example, for the preparation of polymethacrylate from DE-A 30 09 812, or for the preparation of styrene/divinylbenzene copolymers from EP-A 0 173 518. The liquid monomer is in each case dropletized directly within the liquid. However, the disadvantage of the droplet generation in the continuous liquid phase is that it is restricted to large droplets and control of the droplet size is possible only to a reduced degree. A further disadvantage of droplet generation in the continuous phase is that there is a risk of blockage of the nozzle at relatively high temperatures.

BRIEF SUMMARY

It is an object of the present invention to provide a process for preparing polymers from monomers and/or oligomers, which enables the preparation of polymer particles in any size.

The object is achieved by a process for preparing polymers from monomers and/or oligomers by adding a liquid comprising the monomers and/or oligomers dropwise to a continuous liquid phase in a reactor, the continuous liquid phase being immiscible with the liquid comprising the monomers and/or oligomers, and the monomers and/or oligomers reacting in the continuous liquid phase to give the polymer. The liquid comprising the monomers and/or oligomers is shaped to droplets outside the continuous liquid phase, which are then introduced into the continuous liquid phase.

DETAILED DESCRIPTION OF THE PREFERRED EMBODIMENTS

The process according to the invention allows any desired apparatus for generating droplets in the gas phase to be used. This makes it possible to adjust the droplet size as desired. A further advantage of generating the droplets in the gas phase is that the liquid to be dropletized in the apparatus for generating the droplets has no contact with a hot liquid phase and so there is only a very small risk, if any, of blockage of the nozzles. In addition, the droplets can be distributed optimally in the liquid phase, and the available reaction volume can be exploited better.

A further advantage of forming the droplets outside the continuous liquid phase is that the droplets can be formed at a temperature below the initiation temperature of the reaction, and the reaction does not begin until within the continuous liquid phase. In contrast, in the case of formation of the droplets within the continuous liquid phase, as is known from the prior art, there may already be a reaction in the droplet distributor, which makes it possible for the individual nozzles for droplet generation to become blocked by polymerization of the monomer to completion.

The reactor in which the reaction is performed is preferably configured as a tubular reactor. The tube of the tubular reactor is typically a flow tube through which the continuous liquid phase flows.

Selection of a suitable liquid for the continuous liquid phase prevents the individual droplets from agglomerating at the surface of the continuous liquid phase. For this purpose, it is especially advantageous when the continuous liquid phase has a low surface tension, such that the droplets which meet the surface of the continuous liquid phase are immersed immediately into the continuous liquid phase.

In a first embodiment, the droplets of the liquid which comprises the monomers and/or oligomers and the continuous liquid phase flow in countercurrent. In order that the droplets of liquid comprising the monomers and/or oligomers and the continuous liquid phase flow in countercurrent, it is necessary that a driving force for the flow is applied to the droplets. This may, for example, be gravity, and the droplets can move by falling within the continuous liquid phase. In this case, the velocity of the continuous liquid phase must be selected such that the droplets which fall within the continuous liquid phase are not entrained with the continuous liquid phase. Countercurrent flow of the droplets of liquid comprising the monomers and/or oligomers and of the continuous liquid phase allows a comparatively high residence time to be achieved on a relatively small construction space.

However, it is preferred that the droplets of the liquid comprising the monomers and/or oligomers and the continuous liquid phase flow in cocurrent. In this case, the droplets of liquid comprising the monomers and/or oligomers are entrained by the continuous liquid phase. This also has the advantage that the shape of the flow tube within which the reaction is carried out can be varied. For example, it is possible to configure the tube through which the continuous liquid flows in a meandering manner, in order to reduce the construction height. It is also possible to configure the tube, for example, in spiral form. Any other suitable geometry of the flow tube within which the continuous liquid phase flows with the droplets of liquid comprising the monomers and/or oligomers is also conceivable. Owing to the variable geometry of the flow tube, it is possible to achieve any desired residence times through different lengths of the tube. In addition, it is also possible to achieve different residence times by adjusting the flow rate of the continuous liquid phase.

The continuous liquid phase is fed into the reactor configured as a flow tube preferably below the means with which the liquid comprising the monomers and/or oligomers is introduced dropwise. The feed may be above the liquid level of the continuous liquid phase or at the height of the liquid level of the continuous liquid phase. A position below the surface of the continuous liquid phase is also conceivable. Preference is given, however, to an arrangement above the surface of the continuous liquid phase or at the height of the surface of the continuous liquid phase.

Before the liquid is removed again from the flow tube which serves as the reactor, the polymer particles which have formed by reaction of the monomers and/or oligomers present in the droplets are removed. The removal is effected, for example, by means of any solid/liquid separation known to those skilled in the art. The solid/liquid separation can be effected, for example, by means of suitable filters, screens, centrifuges, or else, for example, by means of a hydrocyclone. When filters are used for the separation, suitable filters are, for example, belt filters or rotary pressure filters. A further suitable example is a continuous pusher centrifuge.

When a filter is used to remove the polymer particles, the filtration, especially in the case of preparation of polyamides, is performed at a temperature of more than 80° C., since caprolactam otherwise precipitates out and can block the filter.

In order to remove the continuous liquid phase, for example the white oil, from the polymer particles after the filtration, the polymer particles are preferably washed. An example of a suitable washing liquid is butyl acetate.

After the removal of the solid particles, the liquid phase is passed back into the reactor via the feed. In order to prevent shear forces from acting on the droplets or the polymer particles produced from the droplets, means with which the continuous liquid phase is moved, for example pumps, are positioned outside the reactor which serves as a flow tube. The pumps may, for example, be arranged immediately upstream of the feed or immediately downstream of the solid/liquid separation. However, it is also possible to position the pump at any other position in the connecting line between withdrawal point of the continuous liquid phase and feed of the continuous liquid phase into the reactor.

Alternatively to a flowing continuous liquid phase, whether it be in cocurrent or in countercurrent to the droplets of the liquid comprising the monomers and/or oligomers, it is also possible that the continuous liquid phase does not flow. In this case, it is, however, necessary that the reactor is configured as a vertical tube or as a column, in order that the droplets can fall downward owing to gravity in the nonflowing liquid. In this case, the reactor has a feed through which the liquid can be supplemented, which is discharged, for example, by evaporation or by the withdrawal of the polymer particles produced.

Since the reaction of the monomers and/or oligomers to give the polymers is generally effected at elevated temperature, preference is given to heating the continuous liquid phase. For this purpose, for example, it is possible to configure the reactor with a jacket as the wall and to heat it through the jacket. To this end, a heating medium flows through the jacket. Alternatively, any other type of heating is also conceivable. For example, it is also possible to heat the jacket electrically by using suitable heating elements. It is also conceivable that heating elements are incorporated within the tube, which heat the continuous liquid phase. The temperature to which the continuous liquid phase is heated depends on the reaction performed in the reactor.

Compared to a droplet polymerization in the gas phase, the residence time in the liquid is greater. It is thus also possible to perform reactions which proceed less rapidly. Compared to conventional polymerization methods, for example solution polymerization, precipitation polymerization, bulk polymerization, suspension polymerization, emulsion polymerization, which are carried out, for example, in a stirred tank or a tubular reactor, these reactions, however, are still very rapid. By virtue of the high specific surface area of the droplets, it is possible to control high enthalpies, which makes possible high reaction kinetics, high exothermicity and a high solids content. Owing to the high specific surface area of the droplets, overheating or runaway of the reaction is prevented.

It is a further advantage of the process according to the invention that it is unnecessary to use additional means by which droplet coalescence is prevented. Such means are, for example, surfactants, with which the surface tension is lowered.

The droplets of the liquid comprising the monomers and/or oligomers can be generated by any desired method known to those skilled in the art. Typically, processes for droplet generation, by which droplets are generated in the gas phase, are used. Suitable processes are, for example, nozzles or else bores in a dropletizer plate. When nozzles are used, any desired nozzle form by which droplets are generated is suitable.

To generate the droplets, it is possible, for example, to use one or more spray nozzles. In this case, it is possible to use any desired spray nozzle known to those skilled in the art. The liquid to be sprayed can be supplied under pressure to such spray nozzles. The liquid to be sprayed is divided into individual droplets, for example, by decompressing the liquid in the nozzle bore on attainment of a preset minimum velocity. It is also possible to use single-substance nozzles, for example slot nozzles or full-cone nozzles.

Particular preference is given to using full-cone nozzles. Among these, particular preference is given to those having an opening angle of the spray cone of from 60° to 180°. Especially preferred are full-cone nozzles with an opening angle in the range from 90° to 120°. The droplet diameter which is established in the course of spraying is preferably in the range from 10 to 1000 µm, preferentially in the range from 50 to 500 µm, especially in the range from 100 to 200 µm. The droplet diameter can be determined by methods known to those skilled in the art, for example light scattering, or using characteristics obtainable from nozzle manufacturers. The throughput of each individual spray nozzle used is preferably in the range from 0.1 to 10 m$^3$/h, especially in the range from 0.5 to 5 m$^3$/h.

Alternatively to the use of spray nozzles, it is also possible to use apparatus in which the liquid comprising the monomers and/or oligomers can fall freely in the form of monodispersed droplets. Such an apparatus is described, for example, in U.S. Pat. No. 5,269,980. In addition, droplet generation by laminar jet decomposition is also possible, for example as described in Rev. Sci. Instr. 38(1966) 502.

The use of a dropletizer plate with bores is suitable especially for viscous liquids. The size of the bores is then selected such that not a liquid jet but individual droplets exit through the bores. To this end, a liquid reservoir is present above the dropletizer plate, which comprises the liquid comprising the monomers and/or oligomers. From the liquid reservoir, liquid runs through the bores in the dropletizer plate and drips therefrom into the continuous liquid phase.

It is likewise suitable to generate the droplets by means of pneumatic draw nozzles, rotation, cutting of a jet or rapidly actuable microvalve nozzles.

In the case of generation of droplets in a pneumatic draw nozzle, a liquid jet is accelerated through a diaphragm together with a gas stream. The amount of gas used can be used to influence the diameter of the liquid jet and hence also the droplet diameter.

In the case of droplet generation by rotation, the liquid passes through the orifices of a rotating disk. The centrifugal force which acts on the liquid tears off droplets of defined size. When the droplets are generated by cutting of a jet, it is possible, for example, for a liquid exiting from an orifice or nozzle to be cut into defined segments with a rotating blade. Each segment subsequently forms a droplet.

In the case of use of microvalve nozzles, droplets with a defined liquid volume are generated directly.

When the liquid comprising the monomers and/or oligomers is metered in through at least one bore in a dropletizer plate to form droplets, it is advantageous to vibrate the dropletizer plate or the liquid, which generates an ideally monodisperse chain of droplets for each bore on the underside of the dropletizer plate. However, preference is given to not exciting the dropletizer plate.

The number and the size of the bores in the dropletizer plate are selected according to the desired capacity and droplet size. The droplet diameter is typically 1.9 times the diameter of the bore. It should be ensured here that the liquid to be dropletized does not pass too rapidly through the bore and that the pressure drop over the bore is not too great. Otherwise, the liquid is not dropletized, but rather the liquid jet is torn apart owing to the high kinetic energy, i.e. sprayed. The Reynolds number based on the throughput per bore and the bore diameter is preferably <2000, more preferably <1600, especially preferably <1400 and most preferably <1200.

Dropletizer plates used for the process according to the invention have at least one bore, preferably at least 10 and especially at least 50 up to 10 000, preferably up to 5000 and especially up to 1000 bores, the bores advantageously being distributed homogeneously over the dropletizer plate. The distribution is preferably in so-called triangular pitch, in which three bores in each case form the corners of an equilateral triangle.

The distance of the bores is preferably in the range from 1 to 50 mm, more preferably in the range from 2.5 to 20 mm and especially in the range from 5 to 10 mm.

Irrespective of the type of the means used to generate droplets, the distance between the means of generating droplets and the continuous liquid phase is preferably in the range from 20 to 500 mm, more preferably in the range from 30 to 200 mm and especially in the range from 50 to 150 mm.

The droplet size can be influenced as a function of the means used to generate droplets and the viscosity of the liquid comprising the monomers and/or oligomers. The viscosity of the liquid comprising the monomers and/or oligomers can be adjusted, for example, by using solvents in which the monomers and/or oligomers are dispersed. However, preference is given to using a liquid which comprises only monomers and/or oligomers and no solvent. This has the advantage that, on completion of the reaction, no additional solvent has to be removed from the continuous liquid phase or from the polymer obtained. When the monomers and/or oligomers are used without additional solvent, this has the advantage that, on completion of the polymerization reaction, only the continuous liquid phase and the polymer particles have to be separated from one another by any desired solid/liquid separation, and the particles subsequently have to be dried. The drying can be effected, for example, by sparging with nitrogen. However, any other method of drying known to those skilled in the art is also possible. It should be ensured here merely that the atmosphere within which the polymer particles are dried is inert.

Reactions which can be carried out to prepare polymers by the process according to the invention may be all reactions by which polymers can be prepared. For instance, the process can be employed, for example, for ionic or free-radical polymerizations, polyadditions or polycondensations. Especially in the case of use of the process for polycondensations, it is particularly advantageous when the continuous liquid phase comprises the same liquid which is also eliminated in the course of polycondensation.

According to the polymer to be prepared, the liquid comprising monomers and/or oligomers may comprise only one kind of monomers and/or oligomers, or different monomers and/or oligomers. When different monomers and/or oligomers are present, they may either have different functional groups which react with one another and thus form a chain, or monomers and comonomers are used to prepare copolymers.

Particular preference is given to using the process to prepare polyamides. In the case of preparation of polyamides, typically two different monomer units react to give the polymer. The different monomer units will be referred to hereinafter as monomer and comonomer.

In the case of preparation of polyamides, the monomers are, for example, selected from the group consisting of caprolactam, caprolactone and laurolactam, and the comonomers are selected from the group consisting of caprolactam, caprolactone, laurolactam, polytetrahydrofuran and aminocaprolactam.

In addition to the preparation of polyamides, however, it is also possible to prepare any other polymers. For instance, the process according to the invention can especially also be used to prepare poly(meth)acrylates, as used, for example, as superabsorbents.

In addition, the process according to the invention can also be used to prepare polystyrene, polyvinylpyrrolidone, polyacrylamide, polyvinyl alcohol, polyvinylpyrrolidone, polyacrylic acid, polyvinylamines, polymaleic acid, polybutyl acrylate, polycaprolactams and thermoplastic polyurethanes.

In one embodiment of the invention, it is also possible to prepare encapsulated particles. Suitable encapsulation materials for the shell of the encapsulated polymer particles are in principle all materials which are not dissolved, or dissolved partly, by the inner liquid phase. The materials used for the shell may, for example, also be homo- or copolymers of the monomers to be polymerized, provided that they behave as insoluble with respect to the inner liquid phase. The inner liquid phase is the liquid comprising monomers and/or oligomers.

For example, it is possible, in the case of preparation of polystyrene, to use an already polymerized polystyrene as the shell material. In this case, the polystyrene may be used in the form of a melt.

In addition, in the case of preparation of polymers based on N-vinylpyrrolidone, it is possible to use a polyvinylpyrrolidone as a shell material, in which case the polyvinylpyrrolidone can be used in the form of a solution.

Also suitable are thermoplastic polymers such as polyethersulfones, polysulfones or polycaprolactones. Suitable shell materials are additionally waxes such as paraffin wax, which can be dropletized in the form of a melt.

The polymers can be used as an aqueous solution or in the form of a melt. The shell materials may have melting points in the range from 20 to 220° C., preferably in the range from 60 to 200° C.

In order to obtain encapsulated polymer particles, preference is given to adding double droplets dropwise to the continuous liquid phase, the double droplets having a core composed of the liquid comprising the monomers and/or oligomers and an outer shell composed of an encapsulation material or a precursor of the encapsulation material. The double droplets should preferably be generated as mononuclear droplets. In the case of such a double droplet, the core is centered in the interior of the microcapsule and is surrounded by the shell. Suitable apparatuses with which such double droplets can be generated are, for example, multisubstance nozzles, for example those with laminar jet decomposition. Especially suitable are annular gap nozzles. Such annular gap nozzles generally comprise a centered inner nozzle through which the liquid comprising the monomers and/or oligomers is passed as core material, and an annular nozzle gap arranged concentrically thereto for the encapsulation material or the precursor of the encapsulation material. The multisubstance nozzles can also be operated such that the dropletization is effected by means of laminar jet decomposition.

The dropletization can, for example, be promoted by the application of a vibration, for example of a sinusoidal vibration. In these vibration processes, the entire multisubstance nozzle is excited by a vibration generator. The frequencies may be in the range from 50 to 20 000 Hz. Double droplets formed in this way can, after leaving the reactor, either be solidified in a hardening basin or passed through a cooling zone in order to solidify the shell material.

Owing to the shell, it is unnecessary that the monomers and/or oligomers present in the interior of the casing are already converted fully in the reactor to the polymer. The further polymerization can also be effected after the solidification of the shell or at any other later time.

EXAMPLES

Example 1

A solution comprising 17-19% sodium caprolactamate in caprolactam (Brüggolen C20 from Brüggemann) is mixed with a solution comprising capped diisocyanate in caprolactam. The solution comprising the capped diisocyanate comprises about 17% NCO groups (Brüggolen C10 from Brüggemann). The two solutions are mixed with one another in a ratio of 7 to 1.

A capillary is used to dropletize the mixture into white oil at 130° C. The distance between the capillary and the white oil is 50 mm.

The white oil is present within a 1500 mm-high glass column, in which the white oil is pumped in circulation from the top downward and through a filter for solid deposition.

The residence time of the individual droplets in the glass column is 20 seconds. An analysis of the polymer particles withdrawn shows a residual caprolactam content of 2%, a viscosity number (VN), measured to DIN 1628-1 with an Ubbelohde viscometer of the DIN-II type with a capillary constant of 0.0996, at a temperature of 25° C. and with 96% sulfuric acid as a solvent, of 120 ml/g and a mean particle size of 750 μm.

Example 2

A reaction is carried out as described in Example 1, except that the residence time of the droplets in the glass column is 50 seconds. In this case, the residual content of caprolactam is 1%, the viscosity number is 170 ml/g and the mean particle diameter is likewise 750 μm.

Example 3

In contrast to Example 2, a longer residence time in the filter is implemented. In this case, a residual caprolactam content of 0.4% is obtained, the viscosity number is 170 ml/g and the mean particle diameter is 750 μm.

The invention claimed is:

1. A process for preparing polymers from monomers and/or oligomers comprising: adding a liquid comprising monomers and/or oligomers dropwise to a continuous liquid phase in a reactor, the continuous liquid phase being immiscible with the liquid comprising the monomers and/or oligomers, and the monomers and/or oligomers reacting in the continuous liquid phase to produce the polymer, which comprises shaping the liquid comprising the monomers and/or oligomers to droplets outside the continuous liquid phase and then introducing them into the continuous liquid phase, wherein the reactor is configured as a tubular reactor,
    wherein the droplets of the liquid comprising the monomers and/or oligomers and the continuous liquid phase flow are in countercurrent, or
    wherein the droplets of the liquid comprising the monomers and/or oligomers and the continuous liquid phase flow are in cocurrent.

2. The process according to claim 1, wherein the liquid comprising the monomers and/or oligomers is shaped to droplets by means of at least one nozzle or by means of bores in a dropletizer plate.

3. The process according to claim 1, wherein the liquid comprising monomers comprises monomers and comonomers which react with one another to produce the polymer.

4. The process according to claim 3, wherein the monomers are selected from the group consisting of: caprolactam, caprolactone and laurolactam, and wherein the comonomers are selected from the group consisting of: caprolactam, caprolactone, laurolactam, polytetrahydrofuran and aminocaprolactam.

5. The process according to claim 1, wherein double droplets are added dropwise to the continuous liquid phase, the double droplets having a core composed of liquid comprising the monomers and/or oligomers and an outer shell composed of an encapsulation material or a precursor of the encapsulation material.

6. The process according to claim 5, wherein the encapsulation material comprises homo- or copolymers of the monomers used, the homo- or copolymers being insoluble in the liquid comprising the monomers which is present in the core.

7. The process according to claim 5, wherein the double droplets are obtained by means of an annular gap nozzle.

8. The process according to claim 1, wherein the polymers are polyamides, polystyrene, polyvinylpyrrolidone, poly(meth)acrylates, polyacrylamide, polyvinyl alcohol, polyvinylpyrrolidone, polyacrylic acid, polyvinylamines, polymaleic acid, polybutyl acrylate, polycaprolactams and thermoplastic polyurethanes.

* * * * *